US012794375B2

(12) United States Patent
Tirilly

(10) Patent No.: US 12,794,375 B2
(45) Date of Patent: Nov. 10, 2026

(54) PHASE SHIFTING TRANSFORMERS COMPRISING A SINGLE COIL FOR TWO EXCITING WINDINGS FOR VOLTAGE REGULATION AND FOR PHASE SHIFT ANGLE REGULATION

(71) Applicant: General Electric Technology GmbH, Baden (CH)

(72) Inventor: Serge Tirilly, Massy (FR)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 881 days.

(21) Appl. No.: 18/042,666

(22) PCT Filed: Sep. 1, 2021

(86) PCT No.: PCT/EP2021/074084
§ 371 (c)(1),
(2) Date: Feb. 23, 2023

(87) PCT Pub. No.: WO2022/049099
PCT Pub. Date: Mar. 10, 2022

(65) Prior Publication Data

US 2023/0353059 A1 Nov. 2, 2023

(30) Foreign Application Priority Data

Sep. 4, 2020 (EP) .................................... 20194716

(51) Int. Cl.
*H02M 5/10* (2006.01)

(52) U.S. Cl.
CPC .................................... *H02M 5/10* (2013.01)

(58) Field of Classification Search
CPC ....................................................... H02M 5/10
See application file for complete search history.

(56) References Cited

U.S. PATENT DOCUMENTS 6,198,647 B1 * 3/2001 Zhou ........................ H01F 30/14
363/154
6,396,248 B1 * 5/2002 Sen ........................... G05F 1/70
323/215

(Continued)

FOREIGN PATENT DOCUMENTS

DE 1912247 A1 9/1970
EP 3392996 A1 10/2018

OTHER PUBLICATIONS

International Search Report and Written Opinion in PCT/EP2021/074084 dated Nov. 15, 2021 (18 pages).

*Primary Examiner* — Zoheb S Imtiaz
(74) *Attorney, Agent, or Firm* — Eversheds Sutherland (US) LLP

(57) ABSTRACT

The present disclosure relates to a phase shifting transformer. The phase shifting transformer includes two exciting windings sharing the same three double taped coils, a first excited winding having three connected coils, for a phase shift regulation, a second excited winding comprising three connected coils, for a voltage regulation, each of the two exciting windings regulating the voltage of one coil of the second excited winding, and regulating the voltage level of one coil of the first excited winding.

12 Claims, 7 Drawing Sheets

(56) References Cited

U.S. PATENT DOCUMENTS

| | | | | |
|---|---|---|---|---|
| 6,995,646 | B1 * | 2/2006 | Fromm | H01F 38/04 174/105 R |
| 2020/0052486 | A1 * | 2/2020 | Wichert | H01F 30/12 |
| 2020/0335271 | A1 * | 10/2020 | Huang | H01F 27/24 |

* cited by examiner

PHASE SHIFTING TRANSFORMERS COMPRISING A SINGLE COIL FOR TWO EXCITING WINDINGS FOR VOLTAGE REGULATION AND FOR PHASE SHIFT ANGLE REGULATION

TECHNICAL FIELD AND PRIOR ART

The invention relates to a phase shifting transformer (PST) and to an autotransformer combined with such a PST.

Transmission system operators (TSO) in some countries request that autotransformers for interconnection of networks of different voltages be provided with facilities for controlling the phase shift angle in addition to voltage regulation.

Coarse but effective solutions are adopted by some operators, consisting in using in series a conventional network autotransformer with a symmetrical phase shifter assembly.

In general, the voltage level of the medium-voltage network is less than or equal to 245 kV and allows the use of single core symmetrical PSTs (the coils of the PST windings being arranged on one single-core) with tap changers directly connected to the lines. However, these devices require two tap-changers per phase, which means six tap-changers in total; since the autotransformer also includes 3 tap-changers, it makes a total of 9 single-phase tap-changers in the whole system (autotransformer and PST). Sometimes the requested transfer power is very large, and the medium voltage line current is too high for the types of OLTC ("On Load Tap Changer") existing in suppliers' catalogs. PSTs with two magnetic circuits are then required.

The cost of these coarse solutions is very high, and some operators seek for alternative, preferably more competitive, solutions.

The conventional symmetrical PST solutions with one magnetic circuit referenced in the common standard IEC IEEE 60076-57-1202 with respectively the connection phase displacement symbol P S0-3/9 and D S0-3/9 connected in series with conventional step-down autotransformer does allow high power transfers controlled over limited and larger phase-shift angles between continental/national networks of high voltage level and regional networks of medium voltage level.

However, these solutions require the use of six single phase OLTCs for phase-shift control and three additional OLTCs for voltage regulation, making this solution expensive and sometimes even not applicable when the line current of the medium network is too large for the available OLTCs in suppliers' catalogs.

PRESENTATION OF THE INVENTION

The present invention provides a solution to facilitate and allow the combination on the same magnetic circuit, or magnetic core, of an autotransformer, for example a step-down or a step-up autotransformer, with a voltage regulation and a phase regulation of the exciting transformer of a two-core asymmetrical phase shifter.

In a phase-shifting transformer (PST) according to the invention, two on-load tap-changer sets are connected to the same taped coil of the excitation (or exciting) transformer to form two windings:

- a first winding to excite the winding of a series active part dedicated to the voltage regulation;
- a second winding to excite the winding of a series active part dedicated to the control of the phase shift angle.

A phase shifting transformer according to the invention may more particularly comprise:

- a first exciting winding comprising 3 coils, each of said coils comprising a corresponding first tap changer,
- a second exciting winding comprising the same 3 coils as the first exciting winding, each of said coils comprising a corresponding second tap changer,
- a first excited winding comprising 3 connected coils, for a phase shift regulation,
- a second excited winding comprising 3 connected coils, for a voltage regulation;
- the first tap changer of each coil of said first exciting winding regulating the voltage of one coil of said first excited winding, and the second tap changer of said second exciting winding regulating the voltage of one coil of said second excited winding.

The primary winding of the exciting unit draws power from the network.

Thus, the invention relates in particular to a phase shifting transformer comprising:

- 3 double tapped coils of 2 exciting windings,
- 3 coils of a first excited winding, in view of a phase shift regulation;
- 3 coils of a second excited winding in view of a voltage regulation.

Each of said 3 double tapped coils of both exciting windings can regulate the voltage of one of said 3 coils of the first excited winding, and can regulate the voltage of one of said 3 coils of the second excited winding.

Each of said 3 double tapped coils windings can be star (respectively delta) connected and/or the 3 coils of said first and second exciting windings can be star, resp. delta, connected.

Said 3 coils winding, or said 3 connected coils of said first excited winding, in view of a phase shift regulation, can be delta (respectively star) connected.

Said 3 coils winding, or said 3 connected coils of said second excited winding, in view of a voltage regulation, can be star (respectively delta) connected A PST according to the invention includes 3 single-phase tap-changers for the phase shift-angle control and 3 single-phase tap-changers for the voltage regulation.

The 3 coils of the first excited winding, in view of a phase shift regulation, and the 3 coils of the second excited winding, in view of a voltage regulation, can provide series windings with currents in quadrature. In other words, a device according to the invention has a connection diagram combining the use of the same tapped coil by two sets of on-load changers to form two separate windings loading the same tapped coil with currents in quadrature.

The modulus of the resulting current flowing through the coil common to the two exciting windings is much lower than the sum of the moduli of the currents in quadrature.

The invention requires only one tapped coil for each phase instead of two, said tapped coil having a dimensioning power significantly less than the sum of the dimensioning powers of the 2 separate coils known in the art: indeed, for a 1-phase coil, the dimensioning power is the product of the maximum voltage at both ends of the coil time the maximum current that can flows through the coil; for 3-phase coil, it is the cubic root of said product. In other words, the size of the resulting coil implemented in the invention is less than the sum of the size of the separate coils.

Furthermore, the invention, by grouping each 2 tapped coils into a single one, makes possible some general diagrams (see for example FIGS. 2 and 5) of phase shifting transformers.

A phase shifting transformer according to the invention can further comprise means to add a further dephasing angle. Said means may comprise at least 3 coils, each one of said 3 coils being connected in series with a different one of said 3 connected coils of said first excited winding.

The invention also concerns a transformer comprising an autotransformer and a phase shifting transformer according to the invention.

Said autotransformer can be of the step-down type or of the step-up type.

Alternatively, it can be a quadbooster (or quadrature booster) (autotransformer of ratio 1).

In a transformer according to the invention, the 3 coils of said first exciting winding and said second exciting winding can be in a first tank (I), the 3 coils of said first excited winding, in view of a phase shift regulation, and the 3 coils of said second excited winding in view of a voltage regulation, can be in a second tank (II).

The invention also concerns a method for regulating the voltage of an autotransformer, implementing a phase shift transformer (PST) according to the invention, or a method for regulating the voltage of a transformer according to the invention, wherein:

- the level of the voltage provided by said autotransformer or of said transformer is regulated by a 3 coils winding (or excited winding), or by the 3 coils of said second excited winding, of said PST;
- the phase provided by said autotransformer or of said transformer is regulated by the other 3 coils winding (or excited winding), by the 3 coils of said first excited winding of said PST.

DETAILED PRESENTATION OF PARTICULAR EMBODIMENTS

The present invention is described in the context of a three-phase network. In particular, without it being necessary to specify it and unless otherwise indicated, the mention of a winding will refer to any phase, the explanation given for one phase applying to the other phases.

Figure 1:
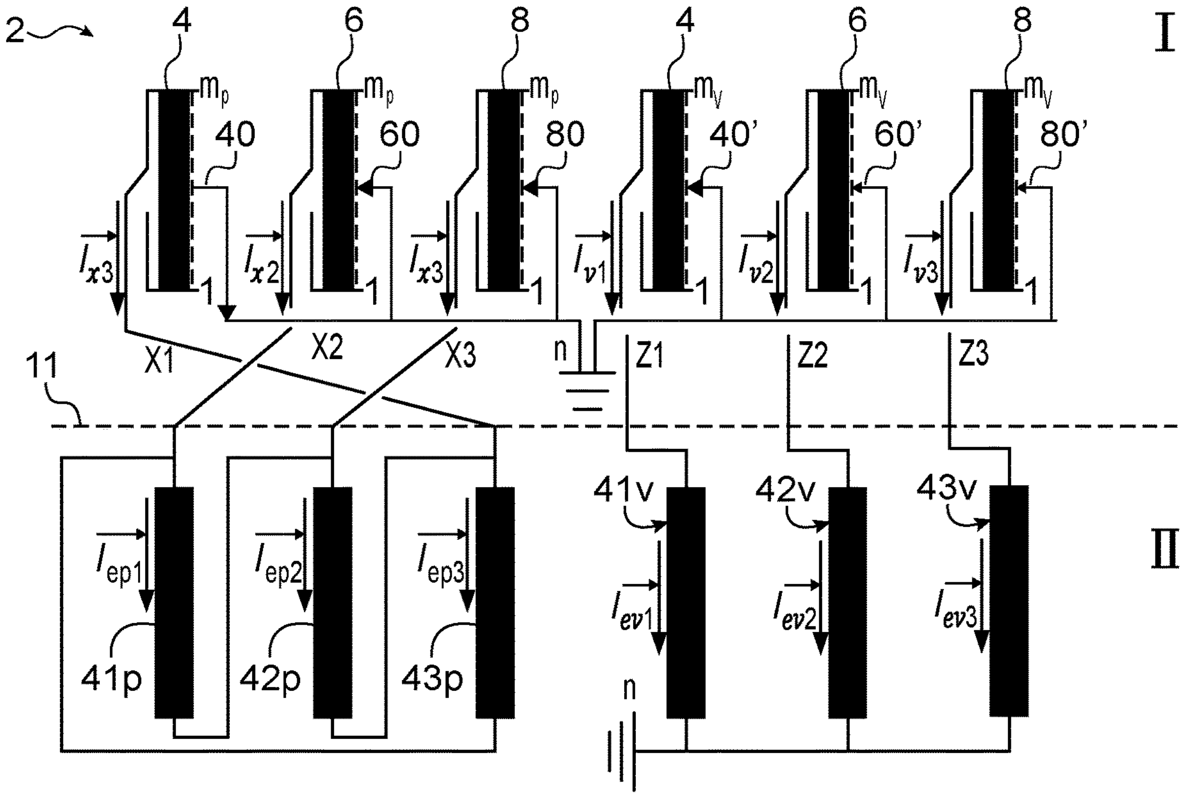
FIG. 1 shows an embodiment of the main parts (exciting windings and excited windings) of a phase shifting transformer according to the invention.

FIG. 1 shows an embodiment of the main parts (exciting winding and excited windings) of a phase shifting transformer 2 according to the invention.

On this figure (and on FIG. 2), in order to facilitate understanding, the exciting coils 4, 6, 8 of a phase shifting transformer according to the invention are shown separated in 2 parts although these two parts form a same coil for 2 exciting windings: for example, a single coil 4, which has two tap changers 40, 40', is implemented for both voltage adaptation coil 41*v* and phase shifting adaptation coil 43*p*. The same applies to coil 6, resp. and to coil 8, with respect to voltage adaptation coil 42*v* and phase shifting adaptation coil 41*p*, resp. to voltage adaptation coil 43*v* and phase shifting adaptation coil 42*p*.

In other words, for each exciting coil 4, resp. 6, 8:

- one tap changer 40', resp.60', 80', regulates the voltage provided to the series active coil 41*v*, resp. 42*v*, 43*v* for voltage level regulation,
- the other tap changer 40, resp.60, 80, regulates the voltage provided to the series active coil 43*p*, resp. 41*p*, 42*p* for phase shift angle control.

Exciting coils 4, 6, 8 are star connected. Alternatively, they could be delta connected; however, a star connection offers some advantages: when the currents needed are becoming too large for the OLTCs, either the voltages have to be increased or the winding connection changed from star to delta to decrease the current values. But, with the delta connection the neutral point is lost and cannot be earthed that is why the delta connection is not the preferred connection mode.

The windings excited by said exciting coils 4, resp. 6, 8 comprise:

- delta connected winding 43*p*, 41*p*, 42*p* (which is connected between X1, X2 and X3), in view of a phase shift regulation; it has to be noted that additional constant phase shift angles may be allowed through introduction of additional coils and special connection of these coils, for example a delta (or extended delta) connection; other types of connections (zig-zag or polygon for example) of additional coils are available;
- star connected winding 41*v*, 42*v*, 43*v* (which is connected between n and Z1, Z2, Z3) in view of a voltage regulation.

Alternatively, exciting coils 4, 6, 8 can be delta connected, winding 43*p*, 41*p*, 42*p* being star connected and winding 41*v*, 42*v*, 43*v* being delta connected.

Figure 2:
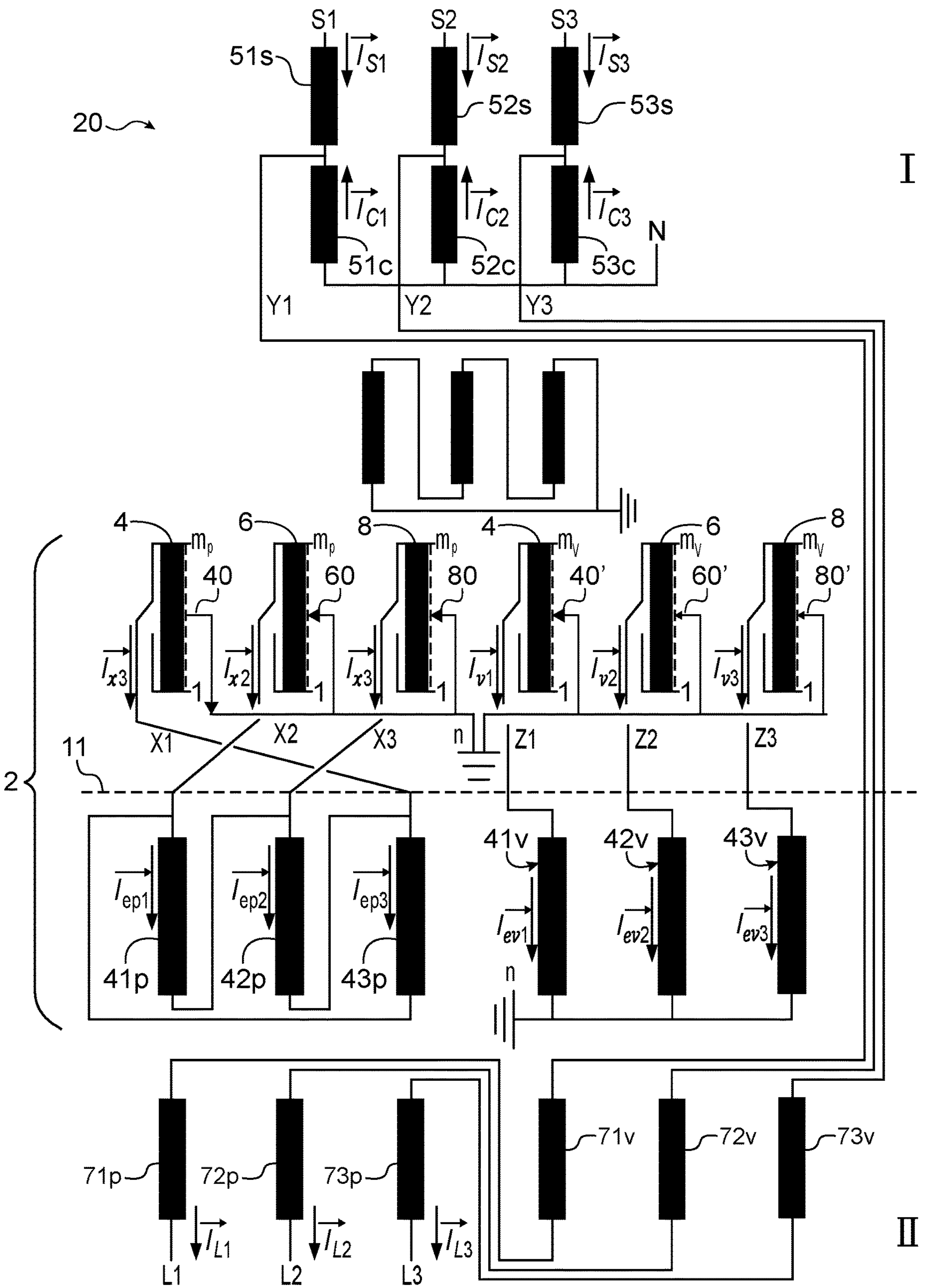
FIG. 2 shows the connection diagram of the combination of a step-down autotransformer of constant voltage ratio with the excitation transformer of an asymmetric three core phase shifting transformer according to the invention.

FIG. 2 shows the connection diagram of the combination of a step-down autotransformer 20 of constant voltage ratio with an asymmetric three core PST according to the invention. In a variant, the invention can also be applied to a step-up transformer.

For each phase, the autotransformer has 2 windings, the high voltage winding (the primary or excitation winding) comprising, or made of, two coils, 51*s* (resp.52*s*, 53*s*, also named "series" coils) and 51*c* (resp.52*c*, 53*c*, also named "common" coils) and the medium voltage winding (the secondary winding or load) comprising, or made of, common coil 51*c* (resp.52*c*, 53*c*).

Figure 4:
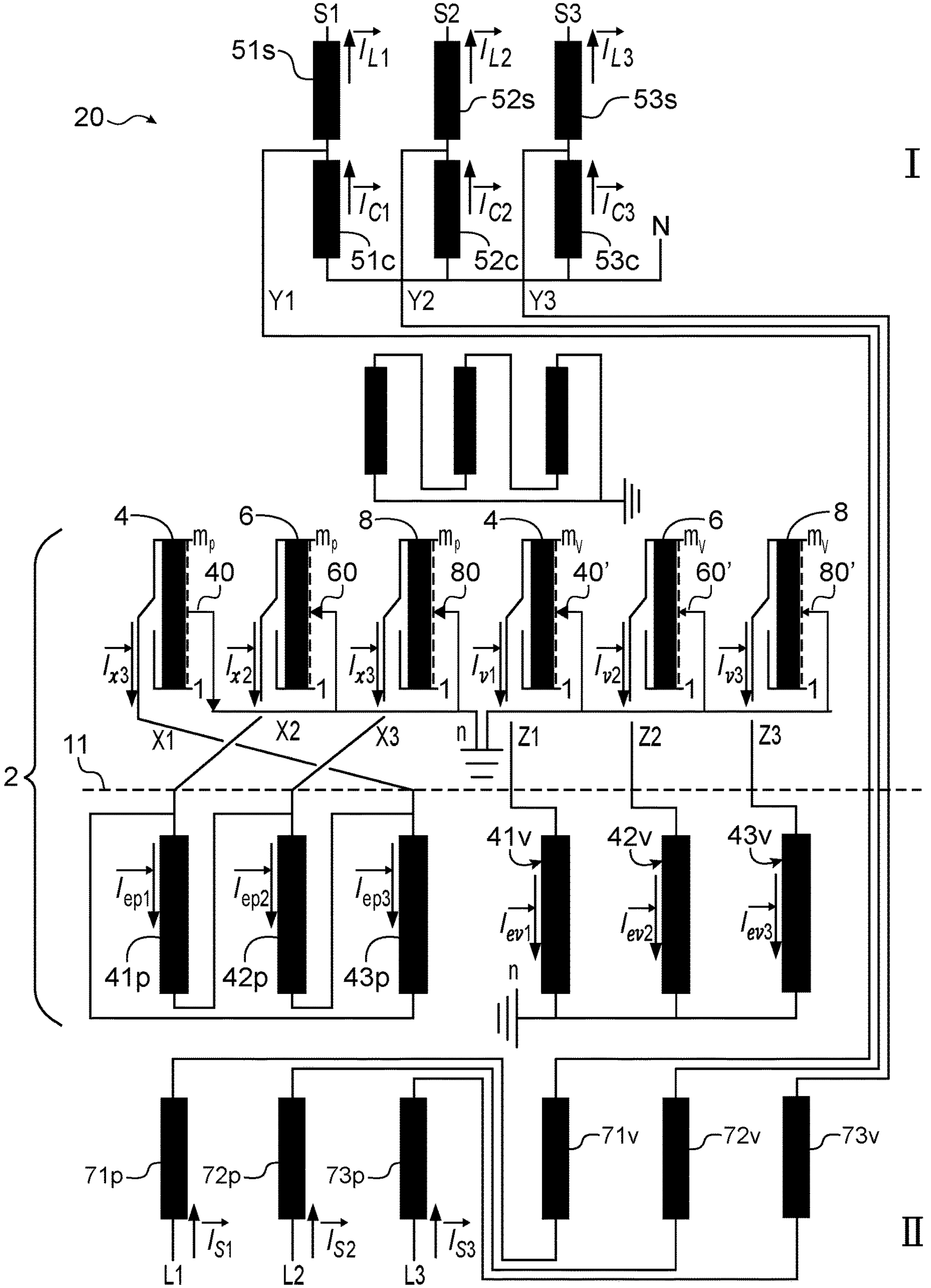
FIG. 4 shows the connection diagram of the combination of a step-up autotransformer of constant voltage ratio with the excitation transformer of an asymmetric three core phase shifting transformer.
Figure 5:
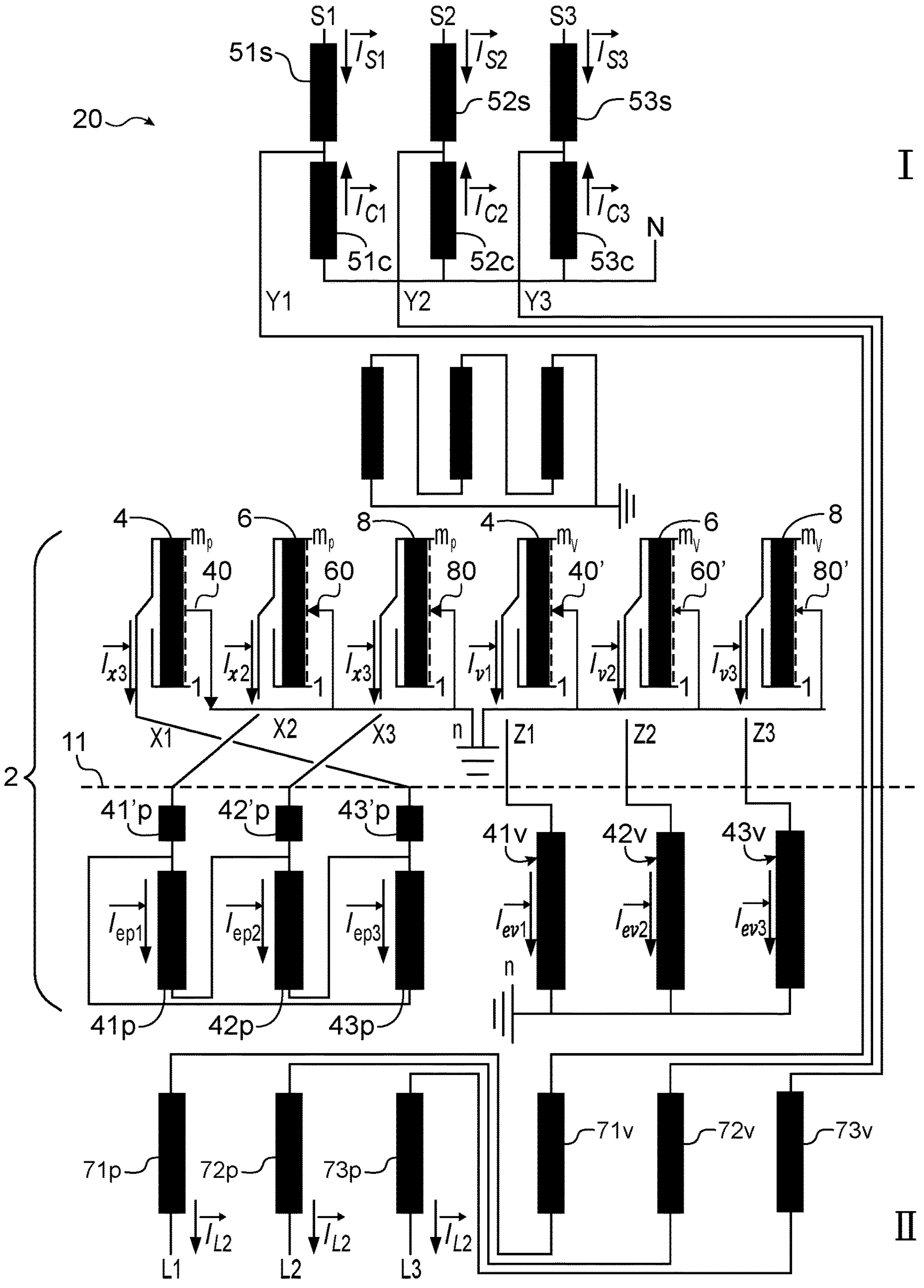
FIG. 5 shows a variant of FIG. 2, further comprising means for a further phase shift.
Figure 6:
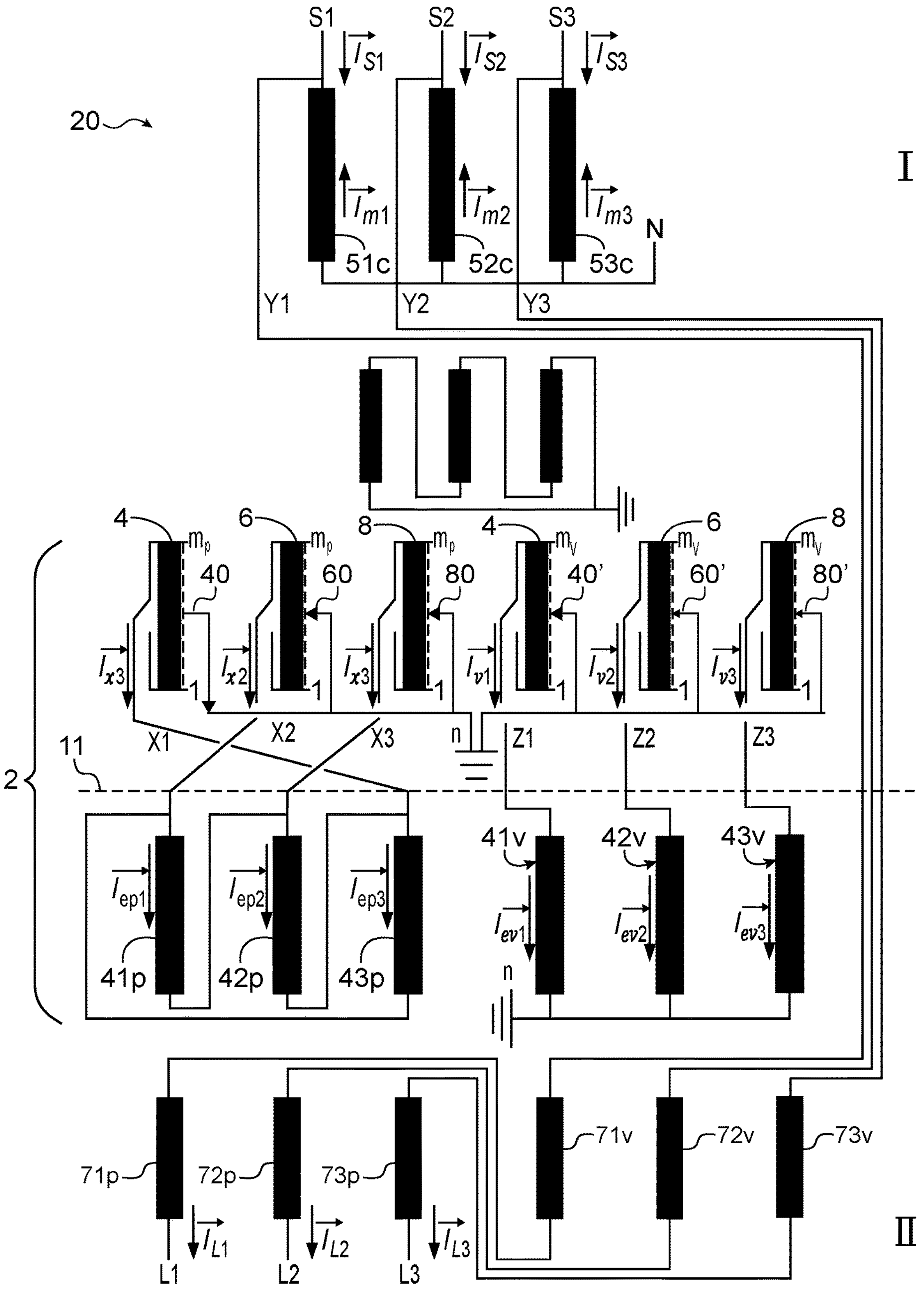
FIG. 6 shows a variant of FIG. 2 for a quadrature booster.

The autotransformer may also comprise stabilizing and/or test windings, as indicated on FIG. 2 (and also on FIGS. 4, 5 and 6).

Series coil 51*s* (resp. 52*s*, 53*s*) is connected between medium voltage line line Y1 (resp.Y2, Y3) and high voltage (HV) line S1 (resp.S2, S3).

Medium voltage coil 51*c* (resp. 52*c*, 53*c*) is connected between neutral N and medium voltage (MV) line Y1 (resp.Y2, Y3).

Line Y1 (resp.Y2, Y3) is connected to coil 71*v* (resp. 72*v*, 73*v*), which is itself connected in series with coil 71*p* (resp. 72*p*, 73*p*).

The level of the output voltage (to L1, resp. L2, L3) is mainly regulated by coil 71*v* (resp. 72*v*, 73*v*) (although it must be noted that there is no complete separation between voltage regulation and phase shift angle control).

The phase angle $\alpha_p$ of the output voltage (to L1, resp. L2, L3) is mainly regulated by coil 71p (resp. 72p, 73p) (here again, it is noted that there is no complete separation between voltage regulation and phase shift angle control).

Each coil 4, resp.6, 8 of both connected exciting windings is located in a first tank I, where it belongs to a first core together with the corresponding coils 51s, 51c, resp.52s, 52c, 53s, 53c, of the autotransformer (see FIG. 2). More precisely, coil 4, resp.6, 8, and coils 51s, 51c, resp.52s, 52c, 53s, 53c, are mounted on a same leg (or column) of the core (one leg (or column) per phase), not represented on FIG. 2.

Each coil 41p, resp. 42p, 43p of the delta connected winding (41p, 42p, 43p) and each coil 41v, resp. 42v, 43v of the star connected winding (41v, 42v, 43v) is preferably located in a second tank II, where it belongs to a second and third core together with one of the series L windings 71p-73p, 71v-73v (see FIG. 2), the dashed line 11 showing the separation between both tanks I and II. More precisely, both coils 41p and 71p are mounted on a same magnetic core, not represented on FIG. 2; the same applies to coils 42p and 72p, resp. 43p and 73p, 41v, and 71v, 42v and 72v, one magnetic core being provided for each phase.

Thus, the PST transformer according to the invention, in combination with an autotransformer, has 7 windings:

- the excitation winding 51s, 52s, 53s (which is common to both the autotransformer and the tapped exciting windings);
- both tapped exciting windings, sharing the same double tapped coils 4, 6, 8 (which belong to the same cores as the autotransformer);
- and two excited windings 41v, 42v, 43v resp. 41p, 42p, 43p, which belong to the same cores as the series windings 71v, 72v, 73v, resp.71p, 72p, 73p;
- and the two series windings 71v, 72v, 73v, and.71p, 72p, 73p.

Figure 3A:
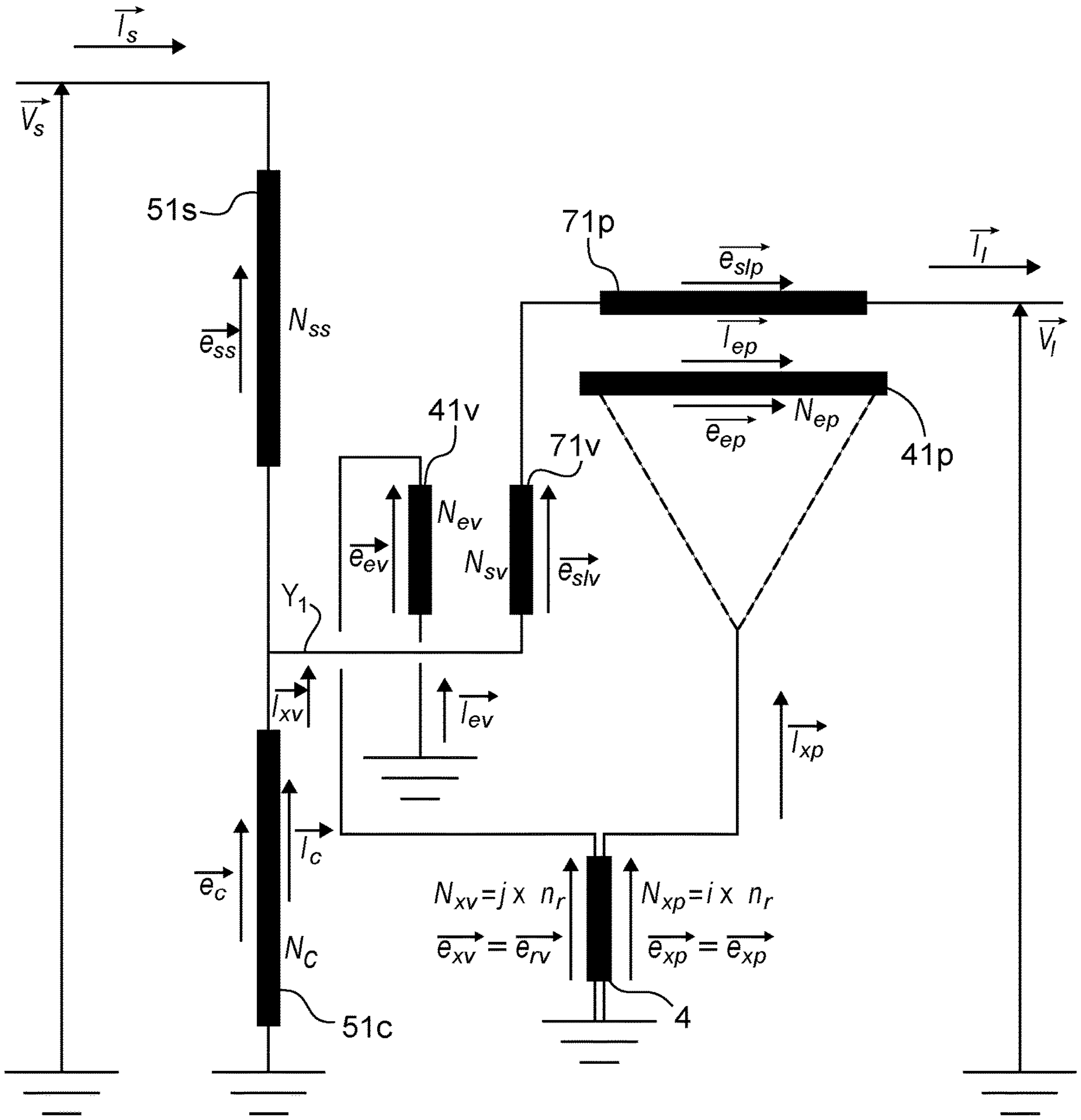
FIG. 3A is an electric equivalent scheme of a single phase of the device according to FIG. 2.

FIG. 3A shows a single phase equivalent electrical scheme of a single phase of the device according to FIG. 2. It has to be noted that this scheme is valid for any of the 3 phases.

For clarity's sake, some currents are not indicated on FIG. 3A: current $I_s$ flows in coil 51s, $I_c$ flows in coil 51c, $I_{ev}$ flows in coil 41p, $I_l$ flows in coil 71v, $I_{xp}$ and $I_{xv}$ flow in coil 4.

Medium voltage on line Y1 is reduced compared to the input voltage $V_{s1}$, according to the number of winding turns $N_{ss1}$, resp. $N_{c1}$, of the coils 51s, resp.51c.

The PST comprises both exciting windings sharing that same tap coil 4 which, as explained above interacts with the autotransformer 20. Said windings excite both voltage regulation coil 41v, interacting with coil 71v, and phase regulation coil 41p, interacting with coil 71p. Each tap of tap coil 4 regulates a number $N_{xv}$, resp. $N_{xp}$, of coil turns, which regulates a current j, resp. i, flowing to coil 41v, resp. 41p, thereby exciting voltage regulation coil 41v, resp. phase regulation coil 41p.

The level of input voltage of coil 71v is regulated by its interaction with coil 41v of the PST. In this example, as can be seen on FIG. 3A, the voltage level is increased from $\vec{e}_{C1}$ to $\vec{e}_{C1}+\vec{e}_{slv}$.

The phase of this regulated voltage is then regulated by the interaction of coil 71p with coil 41p of the PST. In this example, as can be seen on FIG. 3A, a voltage $\vec{e}_{slp}$ is added to voltage $\vec{e}_{slv}$, with respect to which it is shifted by 90°.

The final output voltage $\vec{V}_l$ is given by:

$$\vec{V}_l=\vec{e}_{c1}+\vec{e}_{slv}+\vec{e}_{slp}$$

The level and the phase of this output voltage $V_l$ are thus both regulated, the level of $V_l$ being given by the ratio $N_{ev}/N_{sv}=V_l/V_s$.

By regulating both the voltage level ($e_{slv}$ on FIG. 3A) and the intensity of the phase shifted voltage ($e_{slp}$ on FIG. 3A), the modulus of $V_l$ is regulated on a no-load defined range of voltage and the phase of $V_l$ is controlled on a defined no-load range. For example, a dephasing angle of between +8° up to +250 can be obtained by the PST according to the invention). The phase-angle on load depends on the load current modulus and on the total impedance of the autotransformer and of the phase-shifting transformer as shown in Annex E of IEC/IEEE 60076-57-1202 standard. For example a no-load phase-shift range of +/−25°, may become +20°/−30° on load. In other words, a further constant dephasing angle may be added due to the load.

Figure 3B:
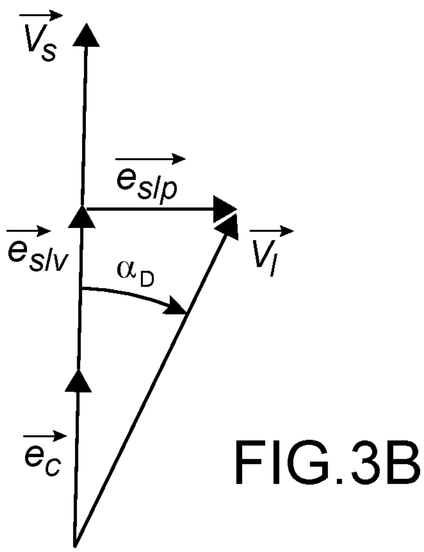
FIGS. 3B and 3C are voltage and current diagrams of a single phase of the device according to FIG. 2.

FIGS. 3B, resp. 3C, shows the corresponding voltage, resp. current, diagrams. The output voltage $\vec{V}_l$ results from the input voltage $\vec{V}_s$, the intensity level of which is reduced down to $e_c+e_{slv}$ which, in turn, is phase shifted by ep. The resulting phase angle is $\alpha_p$, which depends on the relative sizes of $\vec{e}_c$, $\vec{e}_{slv}$ and $\vec{e}_{slp}$. In a method according to the invention it is possible to control the modulus of $\vec{V}_l$ by (through $\vec{e}_{slv}$) and/or to control the phase angle value (through $\vec{e}_{slp}$).

Figure 3C:
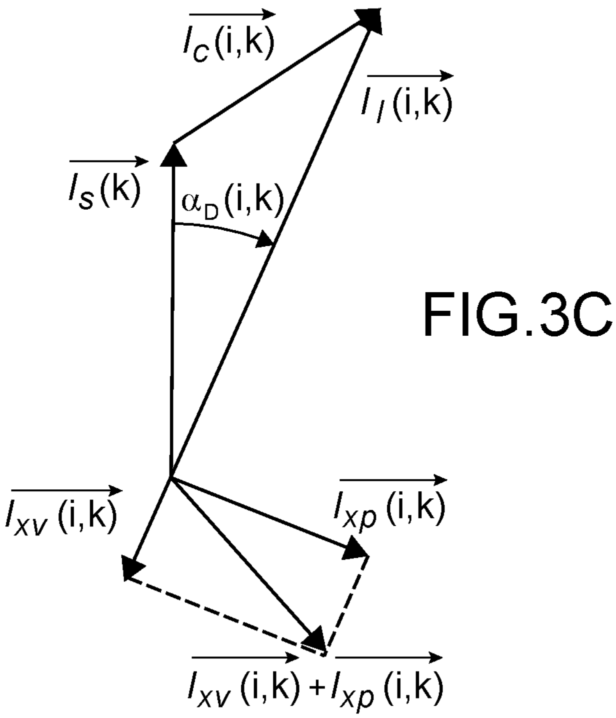

Concerning FIG. 3C:

- currents $I_{xv}$ and $I_{xp}$ flow in coils 4, 6, 8;
- current $I_{ev}$ flows in coil 41v and current $i_{ep}$ in coil 41 p; both currents have the same direction as current $I_l$ that flows in coils 71v and 71 p.
- coils 41v, 42v, 43v and 4, 6, 8 are both connected; then $I_{xv}$ and $I_{ev}$ have the same direction;
- coils 41p, 42p, 43p are delta connected and coils 4, 6, 8 are star connected;
- hence currents $I_{ep}$ and $I_{xp}$ are in quadrature, and $I_{ev}$ and $I_{ep}$ are also in quadrature.

The modulus of the resulting current $I_{xp}+I_{xv}$ flowing through the coils common to the two exciting windings (one exciting winding being the set of coils (4, 6, 8) connected to n and (X1, X2, X3) through the set of OLTCs for phase control, the other one being the set of coils (4, 6, 8) connected to n and (Z1, Z2, Z3) through the set of OLTCs for voltage regulation) is much lower than the sum of the moduli of the currents $I_{xp}$ and $I_{xv}$ in quadrature.

The invention was explained in combination with a step-down transformer, but can be applied as well to a step-up transformer. The connection diagram of the combination of a step-up autotransformer with an asymmetric three core PST according to the invention is obtained from FIG. 2 by inverting the source and load sides, (S1,S2,S3) and the corresponding references becoming (L1,L2,L32) and vice-versa. FIG. 4 shows a connection diagram of the combination of a step-up autotransformer 20 of constant voltage ratio with an asymmetric three core PST according to the invention: the numerical references are the same as on FIG. 2, only the currents $I_{L1}$, $I_{L2}$, $I_{L3}$ (at the output of 51s, 52s, 53s on FIG. 4) and $I_{S1}$, $I_{S2}$ and $I_{S3}$ (at the input of 71p, 72p, 73p on FIG. 4) being inverted.

FIG. 5 shows a variant of the invention, in which a constant dephasing is introduced by connecting further coils

41'*p*, resp. 42'*p*, 43'*p*, to coils 41*p*, resp. 42*p*, 43*p* of the excited windings 41*p*, 42*p*, 43*p*. A further constant phase shift is thus added. The phase-angle on load depends on the load current modulus and on the total impedance of the autotransformer and of the phase-shifting transformer (as shown in Annex E of IEC/IEEE 60076-57-1202 standard). The load angle drop has a constant sign. For example, a no-load phase-shift range of +/−25°, may become +20° (+25°−5°)/−30° (−25°−5°) on load. The constant additional phase-shift of 5° allows the range to be +25° (+25°−5°+5°)/−25° (−25°−5°+5°) on rated load, rated voltage.

FIG. 6 shows an application of a PST according to the invention to a transformer of the "quad booster" type (or "quadrature booster", an autotransformer of ratio 1), comprising 3 coils 51*c*, 52*c*, 53*c* in which the voltage of each HV line S1 (resp.S2, S3) is directly applied to line Y1 (resp.Y2, Y3). Common coil 51*c* (resp. 52*c*, 53*c*) is connected between neutral N and HV line S1 (resp.S2, S3). A single phase equivalent electrical scheme of a single phase of device according to FIG. 6, including a quadbooster, is derived from FIG. 3A by deleting coil 51*s*.

All circuits described in this application can further comprise cabinets with mechanical axes (to control the tap changers) mounted on the transformer tank, with control possibilities from the cabinet and remotely from a control room.

I claim:

1. A phase shifting transformer, comprising:

a first exciting winding comprising three coils, each of the coils comprising a first tap changer;

a second exciting winding comprising the same three coils as the first exciting winding, each of the coils comprising a corresponding second tap changer;

the first excited winding comprising three connected coils, for a phase shift regulation; and the second excited winding comprising three connected coils, for a voltage regulation;

the first tap changer of each coil of the first exciting winding regulating the voltage of one coil of the first excited winding, and the second tap changer of each coil of the second exciting winding regulating the voltage of one coil of the second excited winding;

wherein the first tap changer and the second tap changer of each of the three coils load the respective coil with currents in quadrature.

2. The phase shifting transformer according to claim 1, the three coils of the first and the second exciting windings being star, resp. delta, connected.

3. The phase shifting transformer according to claim 1, the three connected coils of the first excited winding, for a phase shift regulation, being delta, resp. star, connected.

4. The phase shifting transformer according to claim 1, the three connected coils of the second excited winding, for a voltage regulation, being star, resp. delta, connected.

5. The phase shifting transformer according to claim 1, further comprising means to add a further constant dephasing angle.

6. The phase shifting transformer according to claim 5, the means to add a further constant dephasing angle comprising at least three coils, each one of the three coils being connected in series with one of the three connected coils of the first excited winding.

7. A transformer comprising an autotransformer and a phase shifting transformer according to claim 1.

8. The transformer according to claim 7, the autotransformer being of the step-down type.

9. The transformer according to claim 7, the autotransformer being of the step-up type.

10. The transformer according to claim 7, the autotransformer being a quadbooster.

11. The transformer according to claim 7, the three coils of the first exciting winding and the second exciting winding being in a first tank, the three coils of the first excited winding, in view of a phase shift regulation, and the three coils of the second excited winding in view of a voltage regulation, being in a second tank.

12. A method for regulating the voltage of a transformer according to claim 7, wherein:

the voltage provided by the autotransformer is regulated by the three coils of the second excited winding of the phase shifting transformer; and the phase shift angle provided by the autotransformer is regulated by the three coils of the first excited winding of the phase shifting transformer.

* * * * *